United States Patent [19]

Wells

[11] Patent Number: 5,214,368
[45] Date of Patent: May 25, 1993

[54] JUMPER READY BATTERY

[76] Inventor: Mickey D. Wells, 8220 Breeze Cove La., Orlando, Fla. 32819

[21] Appl. No.: 815,248

[22] Filed: Dec. 31, 1991

[51] Int. Cl.⁵ .................................................. H02J 1/00
[52] U.S. Cl. .......................................... 320/2; 320/25
[58] Field of Search ............... 320/2, 3, 4, 5, 6, 25, 320/26, 48; 307/10.7; 191/12.2 R

[56] References Cited

U.S. PATENT DOCUMENTS

| | | | |
|---|---|---|---|
| 3,963,972 | 6/1976 | Todd | 320/2 |
| 4,489,223 | 12/1984 | Puckett et al. | 320/2 X |
| 4,791,347 | 12/1988 | Britton | 320/2 |
| 4,885,524 | 12/1989 | Wilburn | 320/25 |
| 4,902,955 | 2/1990 | Manis et al. | 320/2 |
| 4,924,176 | 5/1990 | Tremblay | 320/25 X |
| 5,083,076 | 1/1992 | Scott | 320/2 |

Primary Examiner—Steven L. Stephan
Assistant Examiner—Kristine Peckman
Attorney, Agent, or Firm—Warren L. Franz

[57] ABSTRACT

A standard automobile battery is modified to contain a set of retractable jumper cables, pre-attached to the positive and negative terminals of the battery. The cables are housed in a separate chamber formed either internally in a modified battery casing or externally in an auxiliary structure augmenting the usual casing. A bulb is connected across the cables to provide visual indication of good cable contact. Jumper clamps are made luminescent.

12 Claims, 2 Drawing Sheets

JUMPER READY BATTERY

BACKGROUND OF THE INVENTION

Several problems face the motorist, confronted with a "dead" battery, who seeks to jump start an automobile. Jumper cables get lost, and are never with you when you need them. Establishing electrical connection, using jumper cable clamps, between your automobile battery and the battery of another automobile is a nuisance. Battery posts are not always readily accessible, and knowing whether good contact has been made is always a problem, especially when (as is good safety practice) the last clamp attachment is made indirectly through the automobile frame. Unless good contact is confirmed, you can never be sure whether a breakdown is caused by a "dead" battery, or not.

The jumper ready battery of the invention provides conveniently, readily accessible jumper cables, that are easy to use and offer beneficial contact establishing advantages. The jumper ready battery of the invention eliminates the need to carry a separate set of jumper cables.

SUMMARY OF THE INVENTION

The jumper ready battery of the invention is a standard automobile battery, modified either internally or externally to provide significant jump start related improvements. The first is that the battery contains a set of retractable jumper cables that are pre-attached to the positive and negative poles of the battery. The retractable cables are housed inside the battery or in an auxiliary structure closely associated with the battery. The battery clamps may be made luminescent, to glow in the dark. For contact confirmation purposes, the battery is augmented to include a small flashlight that can be used either as a mechanic's light or to assist in the jumping process. The retractable cables are preferably four gauge wire with a length of six to ten feet. In a modified embodiment, the "jumper ready battery" comprises a conventional battery to which an add-on retractable cable fixture is mounted.

BRIEF DESCRIPTION OF THE DRAWINGS

Embodiments of the invention have been chosen for purposes of illustration and description, and are shown in the accompanying drawings, wherein.

Throughout the drawings, like elements are referred to by like numerals.

DESCRIPTION OF PREFERRED EMBODIMENTS

Figure 1:
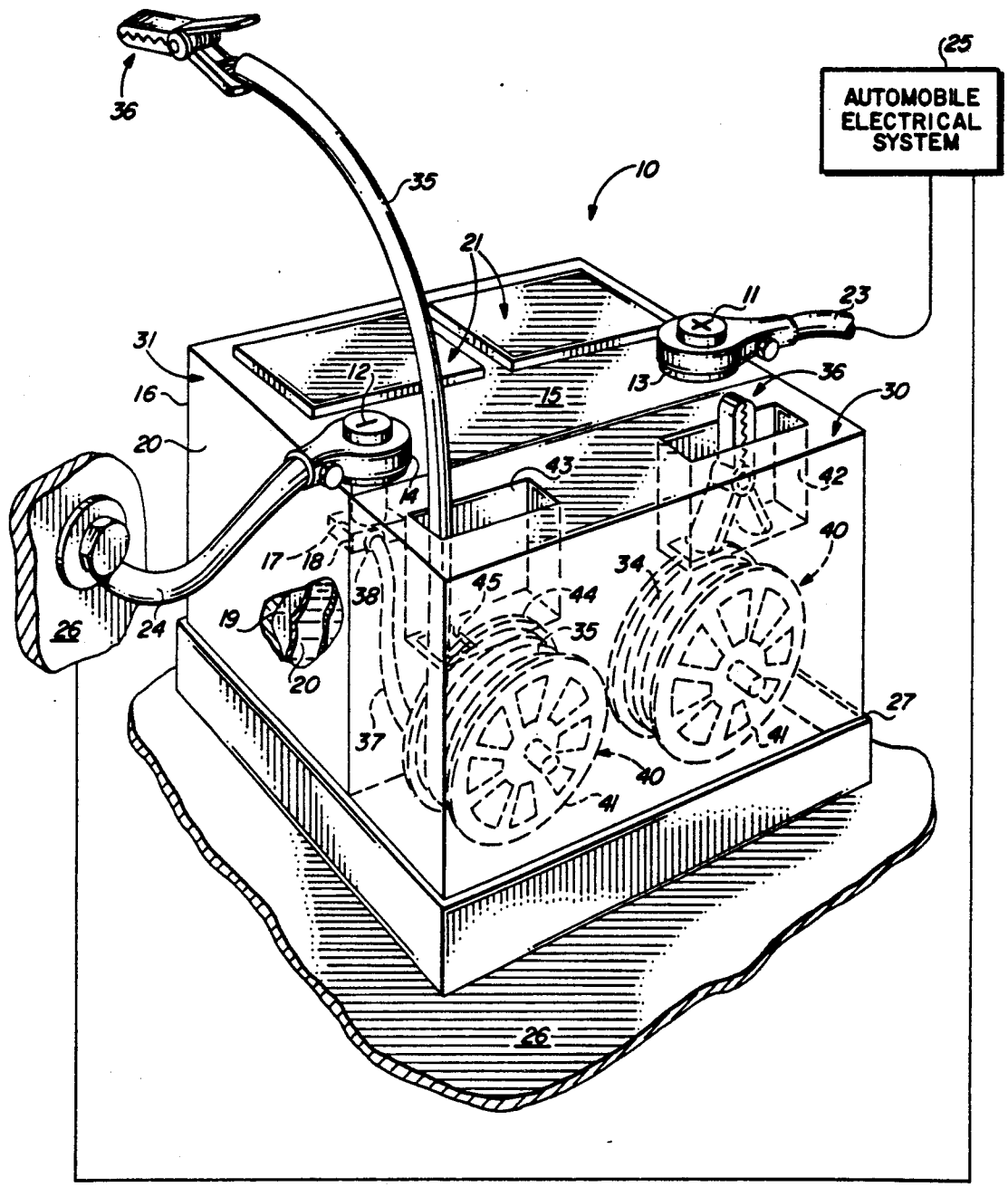
FIG. 1 is a view of a jumper ready battery in accordance with the invention.

As shown in FIG. 1, an automobile battery 10 includes positive and negative terminal posts 11, 12 connected via seals 13, 14 through cover 15 of a container 16 to post straps 17 and plate lugs 18 for electrical communication with plates 19 immersed in an electrolyte 20, such as a water-based solution of sulfuric acid. This connection is made in conventional manner, with caps 21 of vent plugs being located on the cover 15 to enable gas evacuation and replenishment of electrolyte. In conventional manner, conductors 23, 24 connect the battery terminals 11, 12, respectively, to positive and negative sides of an automobile electrical system 25; the negative connection being made, as is customary, by attachment of the conductor 24 to the automobile frame 26. The base of the battery casing 16 is supported in suitable fashion, such as in a tray 27 mounted on the frame 26. Well-known means (not shown) are utilized to lock the battery 10 within the tray 27.

In accordance with the invention, the container 16 includes a separate chamber 30, isolated from the electrolyte chamber 31, and within which jumper cables 34, 35 are stored. Each cable includes, at one end, an alligator clamp or similar mechanism 36 for establishing electrical contact between the associated cable 34, 35 and a corresponding positive or negative post of a remote battery of another automobile used for jumping purposes. For ease of manipulation in the dark, the handle parts of the clamps 36 are coated with a luminous material, such as phosphorescent paint. At its other end, each cable 34, 35 includes means for establishing electrical connection to the respective positive or negative pole 11, 12 of the battery 10. For the embodiment of FIG. 1, such communication is established by a lead 37 which electrically couples the inside end of the cable 34, 35 through a seal 38 to the appropriate post strap 17.

The cables 34, 35 are made retractable by attachment about a spool 41 of a retracting mechanism 40 mounted in the chamber 30. Suitable mechanisms 40 may be of a type such as used to retract the electrical cord of a canister vacuum cleaner (see, e.g., the cord reel assembly Part No. 700858 of a Kenmore Vacuum cleaner, Model No. 116.2399182) or of a mechanic's guarded work lamp (see, e.g., the mechanism used to retract the cord of a commercially available Quality cord reel). The electrical connection of the lead 37 to the spool-mounted end of the jumper cables 34, 35 is made using brushes, rotating contacts, or similar known devices. To prevent retraction of the clamps 36 into the interior of chamber 30, so that they remain accessible, externally-opening cavities 42, 43 are formed in the cover 15 over the chamber 30. The cavities 42, 43 have open box-like constructions adapted for receiving a major portion of the clamps 36 therein. The bases 44 of the cavities 42, 43 have openings 45, dimensioned to pass the insulated wire portion of the cables 34, 35 but block movement of the clamps 36 into the interior of chamber 30.

For the embodiment illustrated in FIG. 1, the chamber 30 is formed integrally within the same container 16 as the chamber 31 which contains the conventional battery components. The clamps 36 will normally be located in conveniently accessible storage positions (as shown by the right clamp 36 in FIG. 1), within the open cavities 42, 43 formed in the cover 15. When it is desired to jump the battery 10, the cables 34, 35 are drawn out of the cavities 42, 43 (to a position such as shown by the left clamp 36 in FIG. 1) and attached in known manner to the corresponding posts of a remote battery or similar jumping source. Of course, normal safety procedures (such as attachment of the clamp 36 of the negative cable 35 to a frame rather than directly to the remote negative terminal post) must be observed. When the jumping procedure is completed, the clamps 36 are retrieved and the mechanisms 40 are operated to retract the insulated wire portions of the cables 34, 35 about the respective spring-loaded spools mounted for rotation within the chamber 30. The mechanisms 40 are advantageously of a spring-action, ratcheted-type which permit the cables to be withdrawn and held at any one of a plurality of selected uncoiled lengths. In the illustrated embodiment 10, each cable 34, 35 has its own associated retracting mechanism 40.

The described battery 10 provides security and convenience for the motorist, by enabling convenient location of the jumper cables 34, 35 at all times, with one end of each cable 34, 35 already situated in attachment with the associated battery posts 11, 12.

Figure 2:
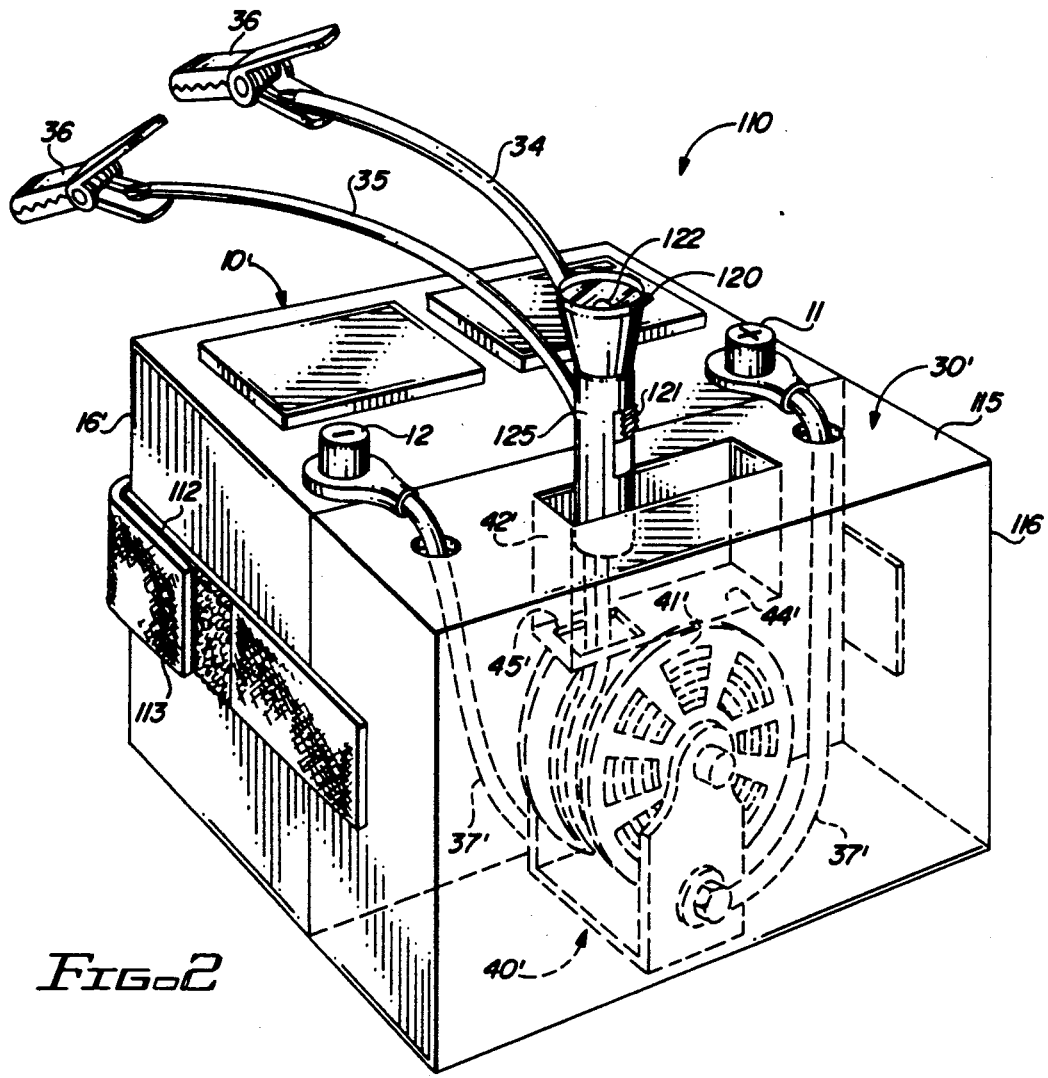
FIG. 2 is a view of a modified form of the battery of FIG. 1.
Figure 3:
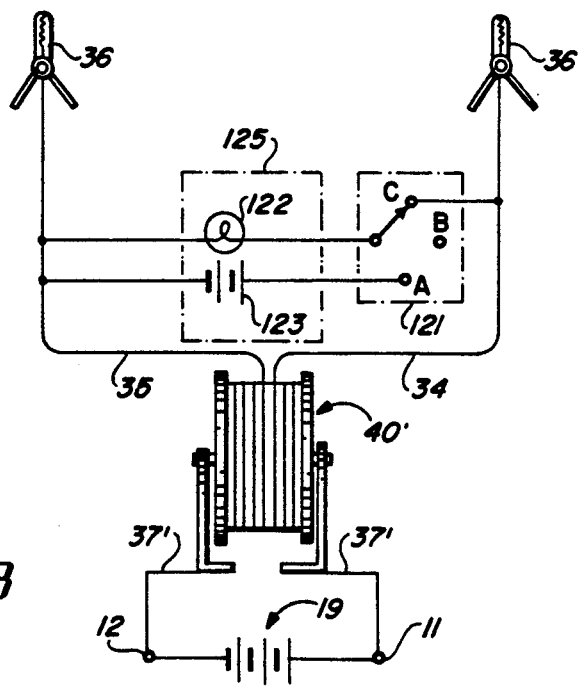
FIG. 3 is a circuit diagram of the battery of FIG. 2.

FIGS. 2 and 3 illustrate a modified form 110 of a jumper ready battery in accordance with the invention. The embodiment 110 is constructed using a conventional battery 10' to which an abutting separate chamber 30' has been added by attachment of an auxiliary container 116. The container 116 is dimensioned to match the casing of the conventional battery 10' and is suitably secured thereto by mating Velcro straps 112, 113, joined to opposite sides of casing 116 and wrapped about the casing 16' of battery 10'.

In variation of the structure of the embodiment 10, the embodiment 110 utilizes a single retracting mechanism 40' for retracting the cables 34, 35. The inner lengths of those cables are joined together and wrapped about a single spool 41', configured in accordance with known principles, to provide electrical attachment of the inner ends of cables 34, 35 to the respective positive and negative terminal posts 11, 12. For the illustrated structure, leads 37' connect externally to the posts 11, 12, thereby requiring no separate seals 38 as in FIG. 1.

According to another advantageous feature of the invention, a flashlight 120 is provided in conjunction with the cables 34, 35. The flashlight 120 includes a hand-operable switch 121 and a bulb 122, electrically connected as shown in FIG. 3. The switch 121 has three positions A, B, C, as indicated. Position A operates flashlight 120 so that bulb 122 is illuminated conventionally by a dry cell battery source 123 installed within the interior of the flashlight housing 125. Position B is the flashlight "off" position, whereby the bulb 122 is open-circuited. And, position C connects the bulb 122 between the cables 34, 35. With the switch 121 in position C, the conventional automobile battery terminals 11, 12, to which the auxiliary jumper housing casing 116 is attached, will operate the flashlight 120. Such connection provides significant advantages. First, with a "live" battery 10', good connection between cables 37' and posts 11, 12 can be confirmed. With switch 121 in position C, bulb 122 will light only if good connection exists. Second, with a "dead" battery 10', good connection between clamps 36 and the terminals (i.e., terminal and automobile frame) of a remote jumping battery can be confirmed. With switch 121 in position C, bulb 122 will light only if good connection exists. It is very frustrating in jumping a "dead" battery, when there is no way to check whether the clamps are making adequate contact. Use of a visual indicator, such as the bulb 122 of flashlight 120 connected as shown in FIG. 3, provides the needed assurance.

A modified cavity 42', larger than cavities 42, 43, is formed in the cover 115 of the container 116 to receive both the flashlight 120 and clamps 36 in retrievable storage position. An opening 45' in the base wall 44' of cavity 42' permits the insulated wire portions of the cables 34, 35 and the narrow rear of flashlight 120 to pass into the interior of cavity 30', but does not pass the enlarged bulb end of the flashlight 120. The flashlight 120 can be secured to one or both of the insulated wire portions of the cables 34, 35, as shown, or may be mounted on its own separate insulated wire. Mounting the light 120 in this manner, provides a convenient retractable work light, operable off the automobile battery, for checking the engine. The negative clamp 36 can be attached to the automobile frame structure to hang the lamp.

Those skilled in the art to which the invention relates will appreciate that other substitutions and modifications can be made to the described embodiment without departing from the spirit and scope of the invention as described by the claims below.

What is claimed is

1. A jumper cable battery comprising:
a container defining first and second chambers;
an electrolyte located in said first chamber;
plates located in said first chamber and immersed in said electrolyte;
positive and negative terminal posts connected through said container to said plates;
positive and negative jumper cables having first and second ends;
means connecting said first ends respectively to said posts;
clamping means, respectively connected to said second ends, for establishing contact with corresponding posts of a remote battery; and
means for automatically retracting said cables from extended positions drawn out of said second chamber to storage positions retrieved into said second chamber.

2. A jumper cable battery as in claim 1, wherein said container comprises an integral body partitioned into said first and second chambers.

3. A jumper cable battery as in claim 1, wherein said container comprises a conventional automobile battery housing defining said first chamber, and an add-on auxiliary housing defining said second chamber.

4. A jumper cable battery as in claim 1, further comprising a bulb, and switch means for selectively electrically connecting said bulb between said cables.

5. A jumper cable battery as in claim 4, further comprising a dry cell battery, and wherein said switch means further comprises means for selectively electrically connecting said bulb across said dry cell battery.

6. A jumper cable battery as in claim 5, further comprising a flashlight housing mounted on said cables; and said bulb, switch means and dry cell battery are housed in said flashlight housing.

7. A jumper cable battery as in claim 1, further comprising means for preventing said clamping means from being drawn into said second chamber when said cables are retracted to said storage positions.

8. A jumper cable battery as in claim 7, wherein said means for automatically retracting comprises a spool located within said second chamber and means for automatically winding said cables about said spool.

9. A jumper cable battery as in claim 8, wherein said means for preventing said clamping means from being drawn into said second chamber comprises said container defining at least one cavity having an external opening dimensioned to permit said clamping means to enter said cavity and an internal opening dimensioned to prevent said clamping means from entering said second chamber.

10. A jumper cable battery as in claim 1, wherein the clamping means comprises spring-loaded clamps.

11. In an automobile having a frame; an electrical system; a battery including a container defining a first chamber, plates located in said first chamber, and first and second terminals connected through said container to said plates; structure supporting said container on said frame; a first conductor electrically connecting said first terminal to said frame; and a second conductor connecting said second terminal to said electrical system; the improvement comprising:

said container defining a second chamber isolated from said first chamber;

jumper cables respectively connected to said terminals; and means enabling the selective placement of said jumper cables in storage positions within said second chamber.

12. A jumper cable battery as in claim 1, wherein the clamping means comprises a luminescent material.

* * * * *